(12) United States Patent
Thekkath et al.

(10) Patent No.: US 6,173,293 B1
(45) Date of Patent: Jan. 9, 2001

(54) SCALABLE DISTRIBUTED FILE SYSTEM

(75) Inventors: Chandramohan A. Thekkath, Palo Alto; Timothy P. Mann, Redwood City; Edward K. Lee, Mountain View, all of CA (US)

(73) Assignee: Digital Equipment Corporation, Maynard, MA (US)

( * ) Notice: Under 35 U.S.C. 154(b), the term of this patent shall be extended for 0 days.

(21) Appl. No.: 09/039,057

(22) Filed: Mar. 13, 1998

(51) Int. Cl.[7] .................................................. G06F 17/30
(52) U.S. Cl. ............................................................. 707/201
(58) Field of Search ...................... 707/1–10, 100–104, 707/200–206

(56) References Cited

U.S. PATENT DOCUMENTS

| 5,465,365 | * | 11/1995 | Winterbottom | 707/101 |
|---|---|---|---|---|
| 5,623,666 | * | 4/1997 | Pike et al. | 707/200 |
| 5,740,367 | * | 4/1998 | Spilo | 709/201 |
| 5,764,972 | * | 6/1998 | Crouse et al. | 707/1 |

OTHER PUBLICATIONS

Anderson et al., "Serverless Network File Systems," ACM Transactions on Computer Systems, vol. 14, No. 1, Feb. 1996, p. 41–79.
Birrell et al., "A Universal File Server," IEEE Transactions on Software Engineering, vol. SE–6, No. 5, Sep. 1980.
Devarakonda et al., "Recovery in the Calypso File System," ACM Transactions on Computer Systems, vol. 14, No. 3, Aug. 1996, pp. 287–310.
Howard et al., "Scale and Performance in a Distributed File System," ACM Transactions on Computer Systems, vol. 6, No. 1, Feb. 1988, pp. 51–81.
Johnson et al., "Overview of the Spiralog File System," Digital Technical Journal, vol. 8, No. 2, 1996.
Kazar et al., "DEcorum File System Architectural Overview," USENIX Summer Conference, Jun. 11–15, 1990, Anaheim, California.
Kronenberg et al., "VAXclusters: A Closely–Coupled Distributed System," ACM Transactions on Computer Systems, vol. 4, No. 2, May 1986, pp. 130–146.
Mann et al., "A Coherent Distributed File Cache with Directory Write–Behind," ACM Transactions on Computer Systems, vol. 12, No. 2, May 1994, pp. 123–164.
Sandberg et al., "Design and Implementation of the Sun Network Filesystem," Sun Microsystems Inc., Mountain View, California.
Shillner et al., "Simplifying Distributed File Systems Using a Shared Logical Disk," Dept. of Computer Science, Princeton University.

* cited by examiner

*Primary Examiner*—Ruay Lian Ho
(74) *Attorney, Agent, or Firm*—Pennie & Edmonds LLP

(57) ABSTRACT

A file system is distributed over a plurality of computers connected to each other by a network. The plurality of computers execute user programs, and the user programs access files stored on a plurality of physical disks connected to the plurality of computers. The file system includes a plurality of file servers executing on the plurality of computers as a single distributed file server layer. In addition, the file system includes a plurality of disk servers executing on the plurality of computers as a single distributed disk server layer, and a plurality of lock servers executing on the plurality of computers as a single distributed lock server to coordinate the operation of the distributed file and disk server layers so that the user programs can coherently access the files on the plurality of physical disks. The plurality of file servers executes independently on a different one of the plurality of computers, and the plurality of file servers communicate only with plurality of disk servers and the plurality of lock servers, and not with each other. Furthermore, the disk server layer organizes the plurality of physical disks as a single virtual disk having a single address space for the files.

20 Claims, 6 Drawing Sheets

SCALABLE DISTRIBUTED FILE SYSTEM

FIELD OF THE INVENTION

This invention relates generally to file systems, and more particularly to file systems distributed over multiple computer systems.

BACKGROUND OF THE INVENTION

In modern computer systems, large collections of data are usually organized on disk storage as files. If the number of files is large, then the files may be distributed over multiple computer systems. Users' programs access the files by requesting file services from one or more file systems. The file systems also perform administrative actions such as controlling coherent access by the clients, communicating with physical storage components, maintaining redundant copies, and recovering from failure.

In most file systems, the files comprise user data and metadata. The metadata are all information required to manage the user data, such as names, locations, dates, file sizes, access protection, and so forth. The organization of the user data is usually managed by the client programs.

It is laborious to administer a large distributed file system that serves a large and growing user community. For instance, to store more files, and to serve more users, one must add more disks and more server computers. Each of these components requires human attention. To simplify the distribution of files, groups of files or "volumes" are often manually assigned to particular disks. Then, the files can manually be moved or replicated when components fill up, fail, or become throughput bound.

Joining many thousands of files distributed over many disks into a redundant array of independent disks (RAID) is only a partial solution; administration problems still arise when the system grows so large to require multiple RAIDs, and multiple server processors.

In the prior art, there are have been numerous attempts to construct distributed file systems that are scalable. Scalable in this context means that the file system can be adjusted to any desired size without changing the underlying architecture of the system. Some of these prior art file systems are now described to illustrate the need for a better scalable file system.

The Cambridge File Server (CFS), described by Birrell et al. in "A universal file server," IEEE Transactions on Software Engineering, SE-6(5):450–453, September 1980, takes a two-layered approach to building a distributed file system. There, the layers provide the users with two abstractions: files and indexes. File systems built on the two layers can use these abstractions to implement a distributed file system. As a characteristic, the CFS manages the entire distributed file system from a single server computer. Controlling data flow from a single server is simple, but in situations where a single server cannot handle the task, the CFS falls short. Also, a single server based system is vulnerable to failure.

The Network File System (NFS), as described by Sandberg et al. in "Design and implementation of the Sun network file system," Proceedings of the Summer USENIX Conference}, pages 119–130, June 1985, is not a file system in itself, but rather a remote file access protocol. The NFS protocol provides a weak notion of cache coherence, and its stateless design requires client users to make many unnecessary and frequent accesses to the servers to maintain a marginal level of coherence in the data.

The Andrew File System (AFS), described by Howard et al. in "Scale and performance in a distributed file system," ACM Transactions on Computer Systems, 6(1):51–81, February 1988, and its offshoot DCE/DFS as described by Kazar et el., in "DEcorum file system architectural overview," Proceedings of the Summer USENIX Conference, pp. 151–164, June, 1990, provides better cache performance and data coherence than NFS. AFS is designed for a different kind of scalability than will be described herein. The AFS has a global name space and security architecture that allows client computers to connect to many separate file servers using a wide area network.

The Echo file system described by Mann et al in "A coherent distributed file cache with directory write-behind," ACM Transactions on Computer Systems, 12(2):123–164, May 1994, is log-based. The Echo file system replicates data for reliability, and access paths are allowed to span multiple disks for availability. In addition, the Echo file system provides coherent caching.

However, the Echo file system cannot easily be scaled. There, each volume can only be managed by a single server computer. Failover, in the case of a hardware failure, can only be to a predetermined backup server. A volume can only span as many disks as can be connected to a single server. Although there is an internal layering of file services on top of a disk service, the Echo file system requires both layers to execute in the same address space on the same machine.

The VMS Cluster file system, described by Strecker et al. in "VAXclusters: A closely-coupled distributed system," ACM Transactions on Computer Systems, 4(2):130–146, May 1986, off-loads file system processing to individual servers that are members of a cluster, i.e., a plurality of closely-coupled computers.

Each server in the cluster executes its own instance of the file system program in conjunction with a shared physical disk. Synchronization is provided by a distributed lock service. The shared physical disk is accessed either through a special-purpose cluster interconnect (CI) to which a disk controller can be directly connected, or through an ordinary local area network (LAN) such as Ethernet, and a processor acting as a disk server.

The Spiralog file system described by Johnson et al. in "Overview of the Spiralog file system," Digital Technical Journal, 8(2):5–14, 1996, also off-loads processing of its file system to individual members of a cluster of interconnected servers that run above a shared storage system layer.

The interface between layers in the Spiralog file system differs from the VMS cluster file system because the lower layer is neither file-like, nor simply disk-like. Instead, Spiralog provides an array of stably-stored bytes, and permits atomic actions to update arbitrarily scattered sets of bytes within the array. Spiralog's split between layers simplifies the file system, but complicates the storage system considerably. Spiralog does not scale easily, nor does Spirolog tolerate hardware faults readily. A Spirolog volume can only span the disks connected to a single server, and the volume becomes unavailable when the server suffers a failure.

Though designed as a cluster file system, Calypso, described by Devarakonda et al. in "Recovery in the Calypso file system," ACM Transactions on Computer Systems, 14(3):287–310, August 1996, is more similar to Echo than the VMS cluster file system. Like Echo, Calypso stores its files on multi-ported disks, i.e., disks that can be accessed by multiple servers. One of the servers directly connected to each disk acts as a file server for data stored on that disk; when the server fails, another server takes over. Other servers in a Calypso cluster access the current server as file system clients. Like Echo, the client computers can maintain coherent caches using a multiple-reader/single-writer locking protocol.

Shillner et al., in a "Simplifying distributed file systems using a shared logical disk," Technical Report TR-524-96, Dept. of Computer Science, Princeton University, 1996, describe a distributed file system on top of a shared logical disk. There, a lower layer uses multiple servers cooperating to implement a single logical disk. In an upper layer, multiple independent servers execute the same file system code on top of the logical disk to provide access to shared files. However, the logical disk layer does not provide redundancy. The system can recover from a failure in a local server, but dynamic reconfiguration of other failed servers is not possible.

Their file system uses careful ordering of operations that write file metadata, but the writes are not logged. Their technique avoids the need for a full metadata scan to restore consistency after a server failure. Unfortunately the shared logical disk can lose track of free blocks after a server failure. This necessitates a time consuming garbage collection process to locate the free blocks.

The xFS file system, described by Anderson et al. in "Serverless network file systems," ACM Transactions on Computer Systems, 14(1):41–79, February 1996, distributes management responsibility for files over multiple servers and provides good availability and performance. However, xFS has a predesignated manager for each file, and the storage server is log-structured working independent of other servers. File system recovery and reconfiguration is not addressed.

An ideal distributed file system would provide all of its users with shared access to the same set of files. Access would be controlled in a coherent and transparent manner so that any users's view of any file at any one time is consistent with any other user's view. In addition, the distributed file system needs to be scalable to any arbitrary size to provide more storage space and higher performance as the need for data by an ever increasing number of users increases. The users would also like to have uninterrupted access to the data of the files, so high availability is a necessity, despite the fact that it is well known that hardware components can unpredictably fail at any time. In order to keep maintenance costs down, the distributed file system should require a minimal amount of human administration, and the complexity of the administration should not increase as more hardware components or users are added.

SUMMARY OF THE INVENTION

Provided is a file system distributed over a plurality of computers connected by a network. The plurality of computers execute user programs, and the user programs access files stored on a plurality of physical disks connected to the plurality of computers. According to the invention, the file system includes a plurality of file servers executing on the plurality of computers as a single distributed file server layer, a plurality of disk servers executing on the plurality of computers as a single distributed disk server layer, and a plurality of lock servers executing on the plurality of computers as a single distributed lock server to coordinate the operation of the distributed file and disk server layers so that the user programs can coherently access the files on the plurality of physical disks.

In one aspect of the invention, each of the plurality of file servers executes independently on a different one of the plurality of computers, and the plurality of file servers communicate only with plurality of disk servers and the plurality of lock servers, and not with each other. Furthermore, each of the plurality of file, disk, and lock servers can execute on a different one of the plurality of computers. Some of the computers executing user programs and file servers can be diskless workstations.

In another aspect of the invention, the disk server layer organizes the plurality of physical disks as a single virtual disk having a single address space.

As an advantage of the invention, the number of computers, users programs, physical disks, files, file servers, disk servers, and lock servers can dynamically change while the user programs, file servers, disk servers, and lock servers execute to provide a scalable file system. Also, the arrangement of the computers, user programs, physical disks, files, file servers, disk servers, and lock servers over the plurality of computers and physical disks can dynamically change while the user programs, file servers, disk servers, and lock servers execute to proved fault tolerance.

DETAILED DESCRIPTION OF THE PREFERRED EMBODIMENTS

System Overview

Figure 1:
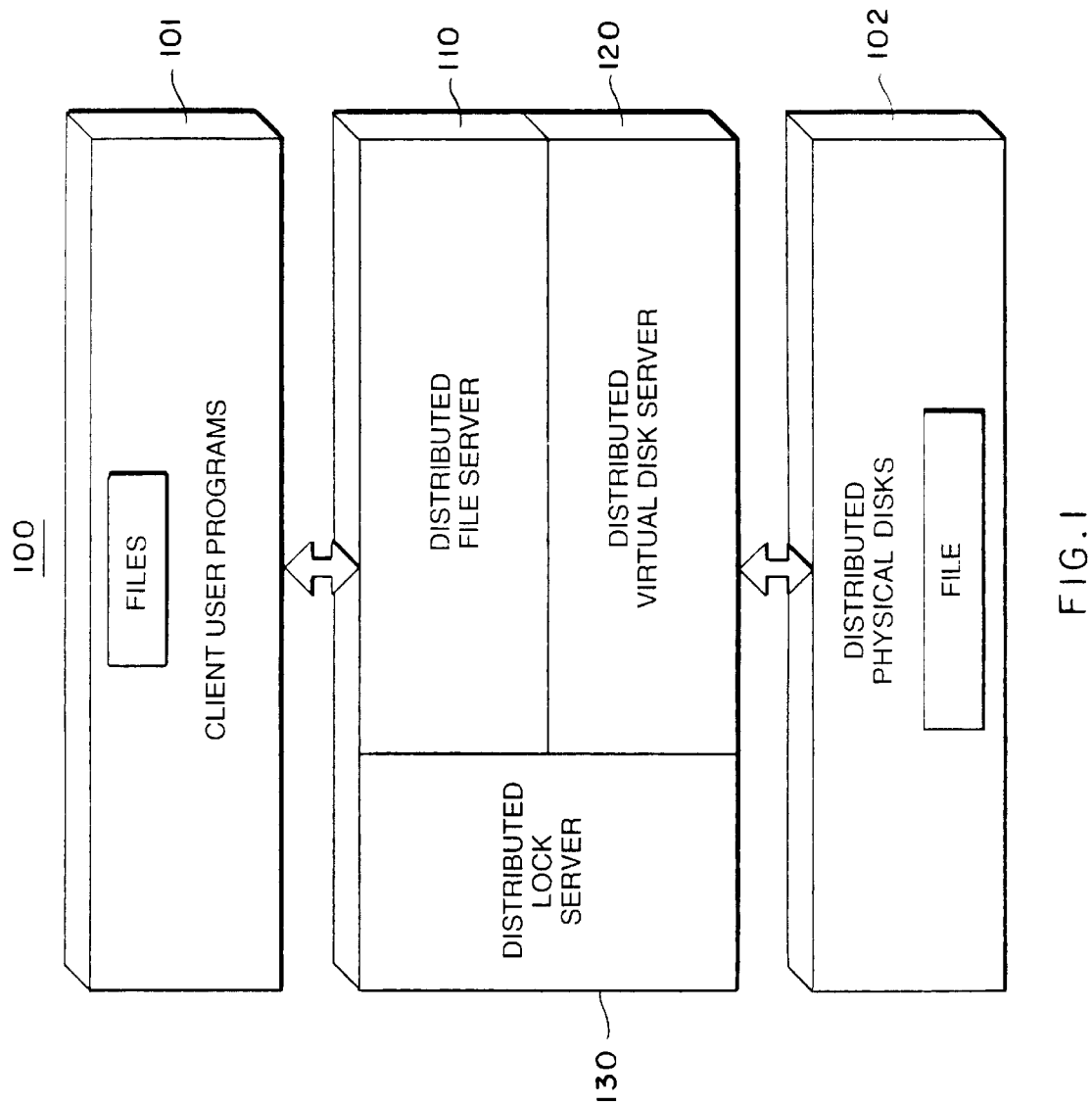
FIG. 1 is a top level block diagram of a file system according to the invention.

FIG. 1 will be used to give an overview of a scalable distributed file system 100 according to the invention. As shown in FIG. 1, client user programs (clients) 101 would like to persistently store data on physical disks 102. The clients 101 organize the data into files which can be written to, and read from the disks 102.

The invention provides a two layer file system to access the disks 102 and to manage the files. A first layer is designed as a distributed file server 110, and a second layer implements a distributed virtual disk server 120. Synchronization and coherence between a plurality of layers 110 is provided by a distributed lock server 130.

The distributed file system 100 can include multiple copies of the file, disk, and lock servers 110, 120, and 130. In this case, each copy of a server can execute on a different physical machine. As a design feature, the number of copies that can concurrently service read and write accesses to the files on the disks 102 by the users 101 can easily by scaled to suit any size user community.

Initially, the servers 110, 120, and 130 can all execute on a single processor, and then later, as the number of users and files increase, additional copies of the servers can be started up to increase storage capacity and improve throughput. This can be done without changing the configuration of existing servers, or interrupting their operation. Each of the distributed servers 110, 120, and 130 can be scaled independent of the other servers. The copies of the servers can be viewed as "bricks'" that can be stacked incrementally to build as large a file system as needed.

A system administrator can add new users without concern about which machines will manage their files, and which disks are used to store the files. The salient point is that even when there are several copies of the servers 110, 120, or 130, the several copies act in a coordinated manner as a single functional unit, and, consequently, the distributed file system 100 gives all user programs a consistent view of the same set of files on the distributed physical disks 101.

The distributed file system 100 according to the invention makes the numerous physical disks 102 appear as a single virtual disk having a single address space. The number of physical components used to implement the file system 100, e.g., processors, disks, and networks is not important. As the load changes, units can be added or removed without disturbing normal operation.

Coherency of data in the files is controlled by the distributed lock server 130. Although the file, disk, and lock servers are shown together, it should be noted that the copies can execute independent on separate physical machines. For example, the file server 110 is designed so that the individual copies run totally independent of each other, the copies only communicate with the disk and lock server, and not with each other. Thus the individual copies can start, stop, and fail without disturbing the operation of the file system.

In one configuration of the present file system, some machines can be dedicated to run application programs and file servers 110, while other machines provide disk and lock servers. In another configuration, any processor can perform any of the file system functions because each copy of can process access requests from any client user program. The file server 110 can use any known file access protocol supported by host operating systems, such as DCE/DFS, NFS, or SMB.

One distinguishing feature of the present file system is that it has a very simple internal structure, a set of cooperating servers use a common virtual disk and synchronize access to that disk with locks. This structure allows one to handle system recovery, reconfiguration, and load balancing with very little machinery. A system administrator can make a full and consistent backup of the entire file system without bringing it down. Backups can optionally be kept on-line, allowing users quick access to accidentally deleted files. The file system 100 tolerates and recovers from machine, network, and disk failures without operator intervention.

Multiple interchangeable servers provide access to the same set of files by being layered on a single shared virtual disk, and the actions of the servers are coordinating with locks to ensure coherence in the data. The file system 100 can be scaled up by adding servers and machines as needed. This structure achieves fault tolerance by recovering automatically from server failures and continuing to operate with the servers that survive. The structure allows the file system to be distributed over multiple machines to optimally balance the load depending on the dynamic operational need of the user programs 101.

Example Server/Machine Arrangement

Figure 2:
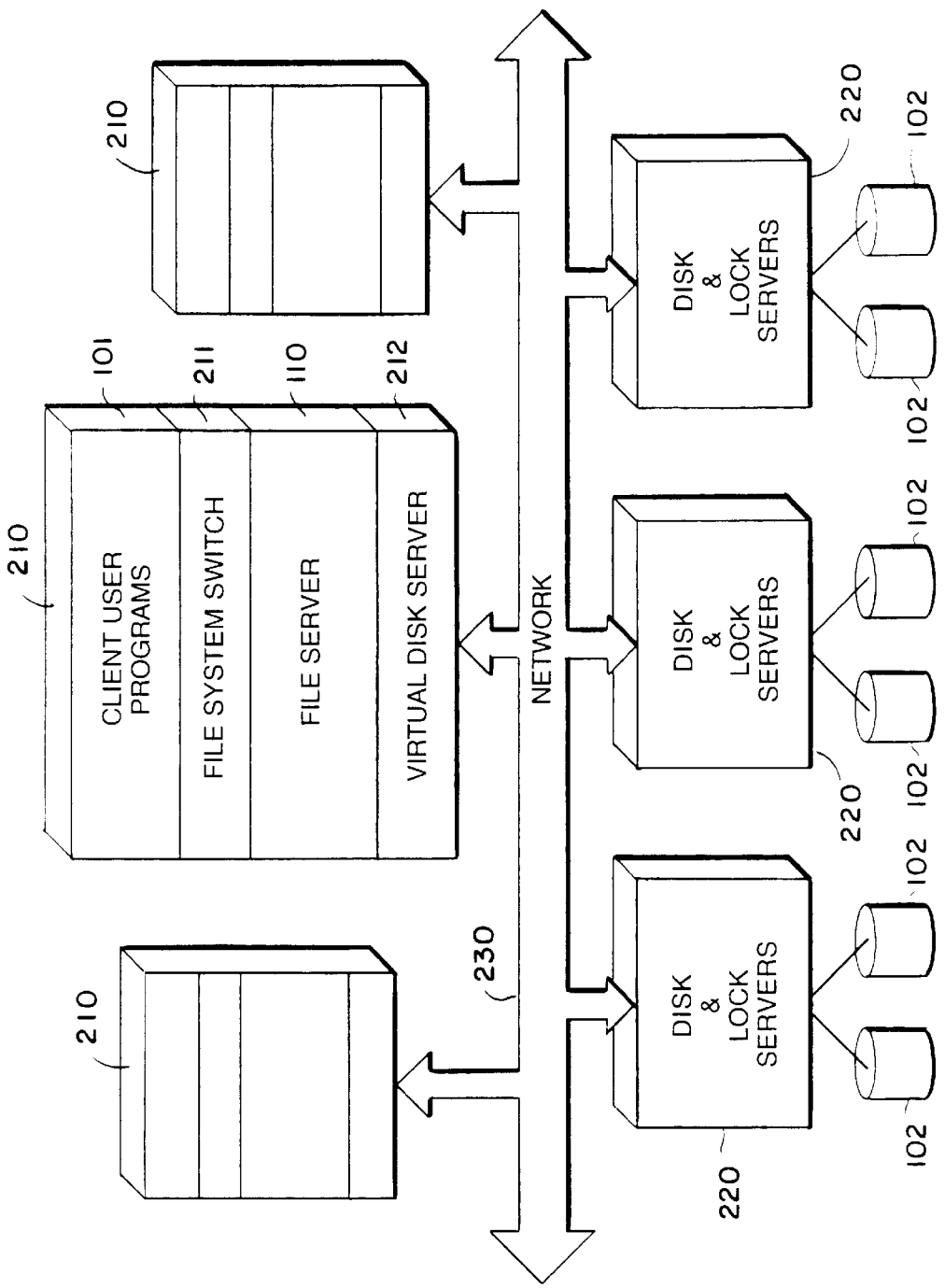
FIG. 2 is block diagram of a plurality of computer systems connected by a network over which the file system of FIG. 1 is distributed.

FIG. 2 shows an example arrangement 200 with assignment of file system functions to various computer systems. The arrangement 200 includes computer systems 210 and 220 connected by a network 230. The systems 210 execute client user programs 101. The systems 210 also include a file system switch 211, a copy 110 of the file server 110, and a virtual disk driver 212. The systems 210 can be workstations, or other similar computer systems. The systems 210 can be diskless. Each system 210 can concurrently execute multiple user programs 101 on behalf of one or more users.

The systems 220 provide the distributed disk server 120 and the distributed lock server 130. The virtual disk can be distributed over physical disks 102 attached to the systems 220. The system administrator can control how the physical disks are distributed over the machines 220.

The functions do not have to be assigned to machines exactly as shown in FIG. 2. For example, the file server 110 and disk servers 120 do not have to execute on separate machines, in some installations it may make sense to use the same machine for both functions, particularly when the file server 110 is not heavily loaded. Similarly, the distributed lock server 130 is independent of the other functions. Instead of having each machine 220 having a copy of the lock server 130, the lock functions can be served from machines 210, or any other available machine.

During operation of the arrangement 200, the client user programs 101 access the files on the disks 102 using operating system call interfaces. User programs executing on different machines all see the same set of files, and their view of the files are coherent, that is, changes made to files on one machine are immediately visible to all user programs 101. Programs get essentially the same semantic guarantees as if the entire arrangement was implemented using, for example, a local Unix (TM) file system.

Changes to the user data of a file is staged through a conventional local buffer pool, and is not guaranteed to reach non-volatile physical storage 102 until a next application of a synchronizing system call. Changes to the metadata of the files are logged, and can optionally be guaranteed non-volatile by the time the system call completes and returns to the user programs 101. In order to avoid a metadata write for each user data read, the file system maintains an approximate last time that a file was accessed. For a complete description of the logging aspects of the file system see U.S. patent application Ser. No. 08/859,670 "Multiple logs for distributed computer systems," filed by Thekkath et al. on May 20, 1997.

The copies of the servers on each machine executes within the machine's operating system kernel. In another embodiment of the invention, copies of the servers may run outside the kernel. When the copies are mounted, the copies registers themselves with the kernel's file system switch 211 as one of the available file system implementations. The servers uses the kernel's buffer pool to cache data from recently used files. The file server 110 reads and writes data of the virtual disk using the virtual disk driver 212. Each copy of the file server 110 maintains its own copy of a "redo" log of pending file changes. The logs are maintained by the virtual disk server 120 so that when any file server 110 fails, the surviving servers read the log to recover from the failure. The various copies of the file server have no need to communicate with each other, they only communicate with the virtual disk server 120, and the lock server 130. Although the copies execute independently, they behave as a single functional unit. This makes server addition, removal, and recovery simple.

The virtual disk driver 212 hides the distributed nature of the virtual disk. To the higher levels of the operating system, it appears as if the files are stored on a local physical disk. The driver 212 is responsible for contacting the correct disk server 120, and for failing over to another server when necessary.

The distributed file system servers execute cooperatively to provide the file system with a large, scalable, fault-tolerant virtual disk that is implemented on top of the physical disks 102 of the machines 220. The file server 110 tolerates multiple machine and network failures as long as the virtual disk and lock service is accessible.

The lock server 130 provide multiple-reader/single-writer locks to the client users 101. For fault tolerance and scalable performance the lock server 130 can be distributed. The file system uses the lock server 130 to coordinate access to the virtual disk, and to keep local cache buffers coherent across multiple servers.

Security

In the configuration shown in FIG. 2, every machine 210 that hosts user programs also hosts a copy of the file server 110. This configuration has the potential for good load balancing and scaling, but poses security concerns. Any machine 210 can read or write any block of the shared virtual disk, so the servers 110 must run on machines with trusted operating systems when a secure operation is desired. It would not be sufficient for the machine 210 executing the file servers 110 to authenticate themselves as acting on behalf of the user programs 101 with the machines 220 executing the disk and lock servers as is done with a remote file access protocols like NFS.

Full security also requires the disk and lock servers to execute on trusted operating systems, and all three types of servers to authenticate themselves to one another. Finally, to ensure file data is kept private, users should be prevented from eavesdropping on the network 130 interconnecting the machines 210 and 220.

In a simple solution, one could fully solve these problems by placing the machines in an environment that prevents users from booting modified operating system kernels on their machines, and then interconnecting the machines with a private network that excludes access by user processes. This does not necessarily mean that the machines must be locked in a room with a private physical network; known cryptographic techniques for secure booting, authentication, and encrypted links could be used instead. Also, in many applications, partial solutions may be acceptable; typical existing NFS installations are not secure against network eavesdropping or even data modification by users who boots a modified kernel on their workstations. It is possible to reach the NFS level of security by having the disk server 120 only accept requests from file server machines with trusted network addresses. The network addresses can be Internet Protocol (IP) addresses.

Client/Server Configuration

Figure 3:
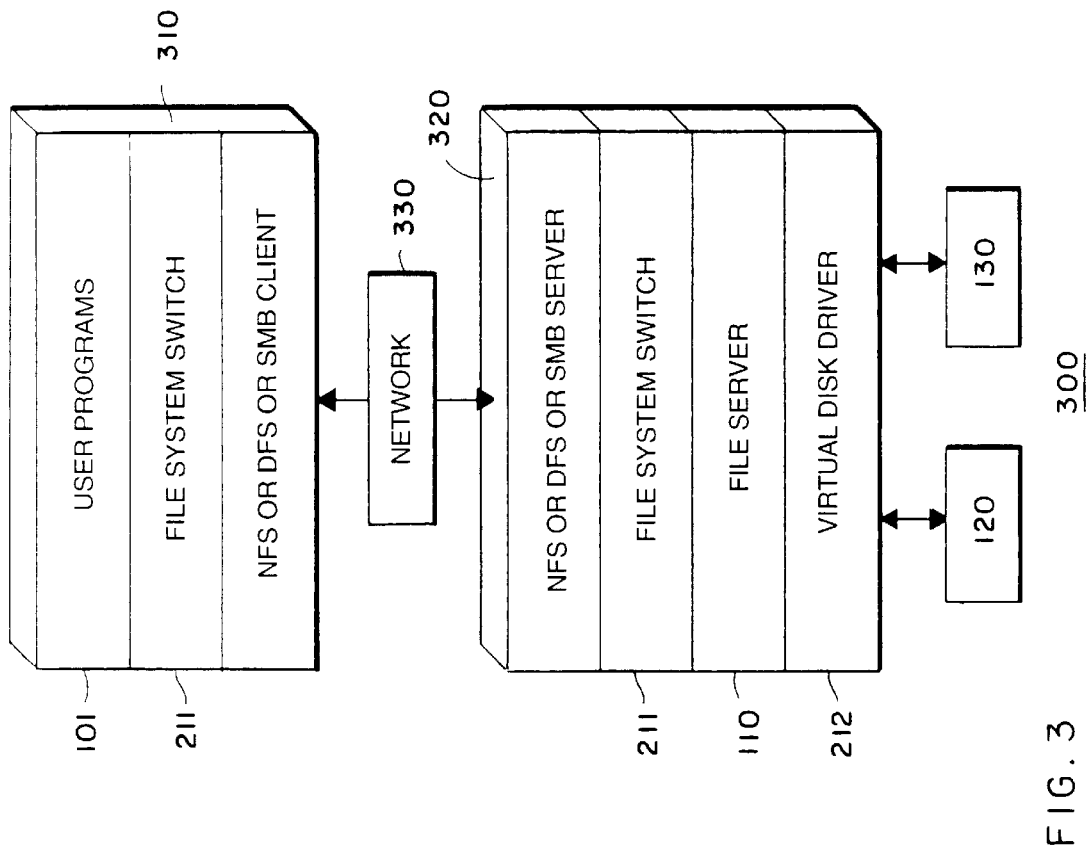
FIG. 3 is a block diagram of a client/server configuration of the file system of FIG. 1.

The present file system can be exported to machines outside a trusted administrative domain using the configuration shown in FIG. 3. In this context, an untrusted client machine 310 is distinguish from a trusted server machine 320. Only the file server 110 executing on the trusted machine 320 communicates directly with the disk and lock servers 120 and 130. The trusted machine 320 can be located in a restricted environment and interconnected by a private network as discussed above. The remote untrusted machine 310 communicates with the trusted machine 320 through a separate network 330. The untrusted machine 310 has no direct access to the disk and lock servers.

Using the file system switch 211, the client user programs 101 can use any file access protocol supported by the host operating system, such as DCE/DFS, NFS, or SMB, because the file server 110 appears just like a local file system on the machine running the server. Of course, a protocol that supports coherent access, such as DCE/DFS, is best, so that the file system's coherence across multiple servers is retained at the next level up. Ideally, the protocol should also support failover from one server to another. The protocols just mentioned do not support failover directly, but the technique of having a new machine take over the network address of a failed machine can be applied here.

Apart from security, there is a second reason for using the client/server configuration 300. Because the file server 110 executes in the kernel of the operating system, it is difficult to port the file system to different operating systems, or even different versions of a single operating system. The client/server configuration 300 allows client programs 101 to access the file system 100 from any remote unsupported system 310 using the network 330. For example, the network 130 can be the Internet, and the machine 310 can be any remote client computer connected to the Internet. The system 100 can than be centralized as an Internet server to provided file services to any number of remote Internet clients.

Virtual Disk Address Space

In the preferred embodiment, the disks 102 can include many individual disk drives, for example, SCCI type disks, which can be configured as a single shared pool of storage using RAID technologies. The virtual disk layer can provide disk caching and supports efficient snap-shots for consistent back-ups. The disks 102 effectively provides a sparse $2^{64}$ byte address space which can be allocated on demand.

Figure 4:
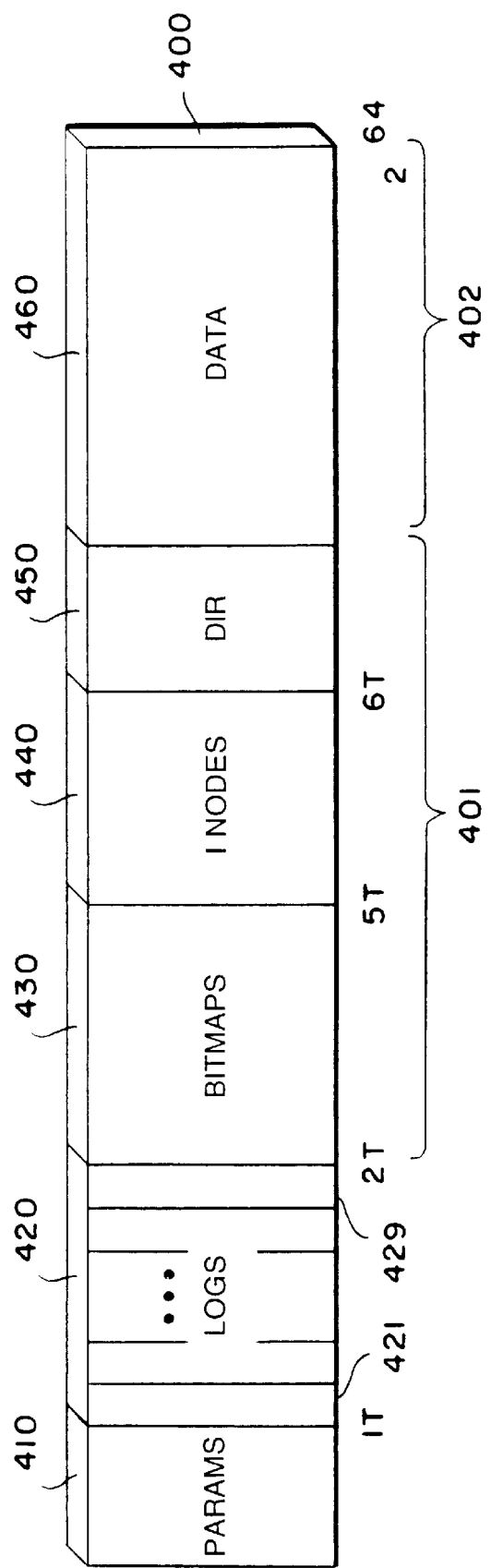
FIG. 4 is a block diagram of a sparse address space of a virtual disk used by the file system.

FIG. 4 shows how the sparse $2^{64}$ byte address space 400 of the virtual disk can be partitioned. Because there is so much virtual addressing space, the addresses do not need to be carefully husbanded and dynamically reused. Addresses can statically be parceled out in generous quantities. Virtual addresses are committed to physical locations when data are written.

A gross partitioning logically allocates addresses in terabyte ($2^{40}$) ranges, e.g., 1T, 2T, etc., in FIG. 4. In order to keep the internal data structures of the file system small, physical addresses are also committed and decomitted in fairly large chunks, for example, 64K bytes.

A first address range is allocated to shared configuration parameters and file system housekeeping information (PARAMS) 410. The second range 420 stores process specific recovery logs 420. There can be one private log for every possible file server process that can execute on the processing units 110, for example, 256 logs 421–322. Fewer or more logs are also possible.

Logs are bounded in size. The physical space allocated to a log is managed as a circular buffer. When the log fills up, a check can made to determine whether the updates described in the oldest, for example, 25% of the log have been carried out. If not, further file updates can be blocked. Otherwise, the tail end of the log can be reallocated.

The rest of the address space from 2T to $2^{64}$ is allocated for data of the file system. This data includes file system metadata 401 and user data 402. The metadata 401 define the structure of the user data 402. The metadata 401 includes bitmaps 430, information nodes (INODES) 440, and directory information (DIR) 450. The bitmaps 430 indicate which virtual addresses are used or available.

The INODES 440 store pointers to the user data, sizes of files, data formats, dates, and the like. The directory information 450 stores user file names, and their equivalent system names or numbers. The user data 402 can be organized as sequential, relational, or object oriented files for example. In one implementation, the file system supports about 16 million files although this limit is easily changed by changing some of the boundaries between the address ranges.

For expediency sake, the emphasis for data recovery in the preferred embodiment is placed on the metadata because if the metadata are lost, then the entire file system is at risk. A reasonable recovery of user data can be achieved by periodic back-ups taken at check-points.

Synchronization and Cache Coherence

With multiple copies of the file server 110 all concurrently modifying shared on-disk data structures for many clients, careful synchronization is needed to give each user and server a consistent view of the data, and yet allow enough concurrency to scale performance as load is increased or servers are added.

Therefore, the file system 100 uses multiple-reader/single-writer locks to implement the necessary synchronization. When the lock server 130 detects conflicting lock requests, the current holder of the lock is asked to release the lock, or to downgrade a write lock to a read lock to remove the conflict.

A "read" lock allows the file server 110 to read the associated data from disk and to cache the data. If the server is asked to release the read lock, then it must first invalidate its local cache entry before complying. A "write" lock allows the server to read or write the associated file data and to cache the data.

A disk block cached by a particular copy of the file server on one of the machines 210 of FIG. 2 can be different from the on-disk version only when the server holds a relevant write lock for the block. Thus, if the server is asked to release its write lock, or downgrade the write lock to a read lock, then the server must write the "dirty" block to disk before complying with the access request. The server can retain the cached block when the server downgrades the lock, but the block must be invalidated before the lock is released.

Instead of flushing the dirty block to disk when a write lock is released or downgraded, it could be possible to bypass the disk and to forward the dirty block directly to the requesting user program. However, for simplicity, this is not done for a number of reasons.

First, with the present design, the various copies of the file server do not communicate with each other. The copies communicate only with the distributed disk and lock servers. Second, the present design ensures that only the log used by the failed server is processed when a server fails. If dirty blocks were directly forwarded, and the destination server with the dirty cache failed, then the log entries referring to the blocks in the dirty cache could be spread out across several machines. This would pose a problem both for recovery, and for reclaiming log space as the log space fills up.

The on-disk data structures described above is partitioned into logical segments with a separate lock for each segment. To avoid false sharing, the file system ensures that a single disk sector does not hold more than one data structure that could be shared. This partitioning of on-disk data structures into lockable segments is designed to keep the number of locks reasonably small while avoiding lock contention in the common case so that the lock server 130 is not a performance bottleneck in the system.

Each log 421–429 is a single lockable segment because logs are private. The bitmaps 430 that are used to indicate which physical disk blocks are available or in use are also partitioned into segments that are locked exclusively. By doing this partitioned based locking, lock contention is avoided when new files are allocated.

A data block 460 or an information node (inode) 440 that is not currently allocated to a file is protected by the lock on the segment of the allocation bitmap that holds the bit marking the block as free. Finally, each file, directory, or symbolic link is one segment; that is, one lock protects both the inode and any file data pointed to by the inode. This per-file lock granularity is appropriate for engineering workloads where files rarely undergo concurrent write-sharing. Other workloads, however, may require a finer granularity of locking.

Atomic Updating of On-disk Data

Figure 5:
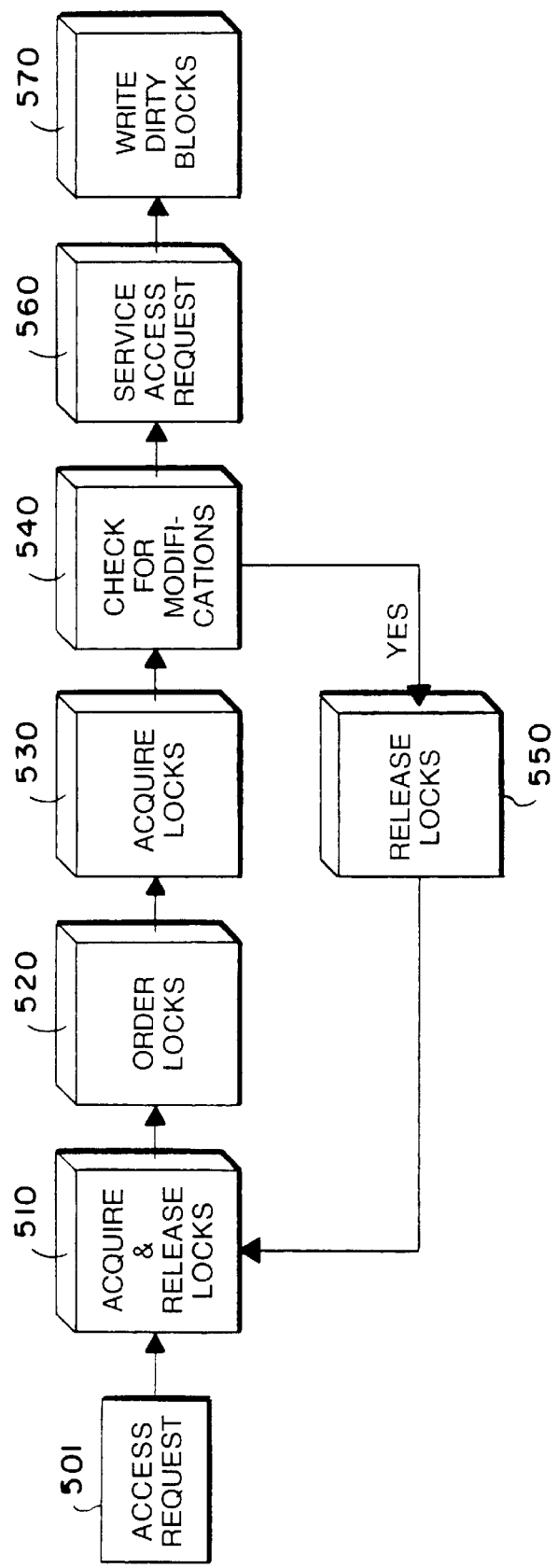
FIG. 5 is a flow diagram of a process for acquiring locks to perform a file access.

Some operations may require an atomic updating of several on-disk data structures covered by different locks. Deadlock is avoided by globally ordering these locks as shown in FIG. 5.

First, to service an access request 501, the particular copy of the file server involved determines what locks are needed. This may involve acquiring and releasing some locks, and to look up names in a directory, step 510. Second, the server sorts the locks in step 520 by virtual disk address, and acquires each lock in the sorted order in step 530. In step 540, the server checks whether any objects examined in phase one were modified while their locks were released in step 510. If so, the server releases the locks in step 550, and loops back to repeat phase one. Otherwise, the access request is serviced in step 560, possible dirtying some blocks in the server's local cache, and writing a log record. The server retains each lock until the dirty block covered by the lock is written back to disk in step 570, at which time the locks can be released or down graded.

Distributed Lock Server

The preferred implementation of the lock server 130 uses only a small, generic set of functions to avoid any performance bottlenecks during normal operation. The lock server provides multiple-reader/single-writer locks for the file server. In this context, the clients of the lock server are the various copies of the file server, and the clients of the file server 110 are the user programs. Locks are sticky; that is, a file server will generally retain a lock until some other copy of the file server needs a conflicting one.

The lock service deals with file server failures using "leases." When a file server first contacts the lock service, it obtains a lease. All locks the client file server acquires are associated with the lease. Each lease has an expiration time, for example, the lease expires thirty seconds after its creation or last renewal. A client file server must renew its lease before the expiration time, or the lock server will consider it to have failed.

Network failures can prevent the file server from renewing its lease even though the server itself has not failed. When this happens, the server discards all its locks and the data in its cache. If any data in the cache were dirty, then the server turns on an internal flag that causes all subsequent requests from user programs to return an error. This condition can be cleared by dismounting the server, this way the error is not inadvertently ignored.

Clerk Module

Figure 6:
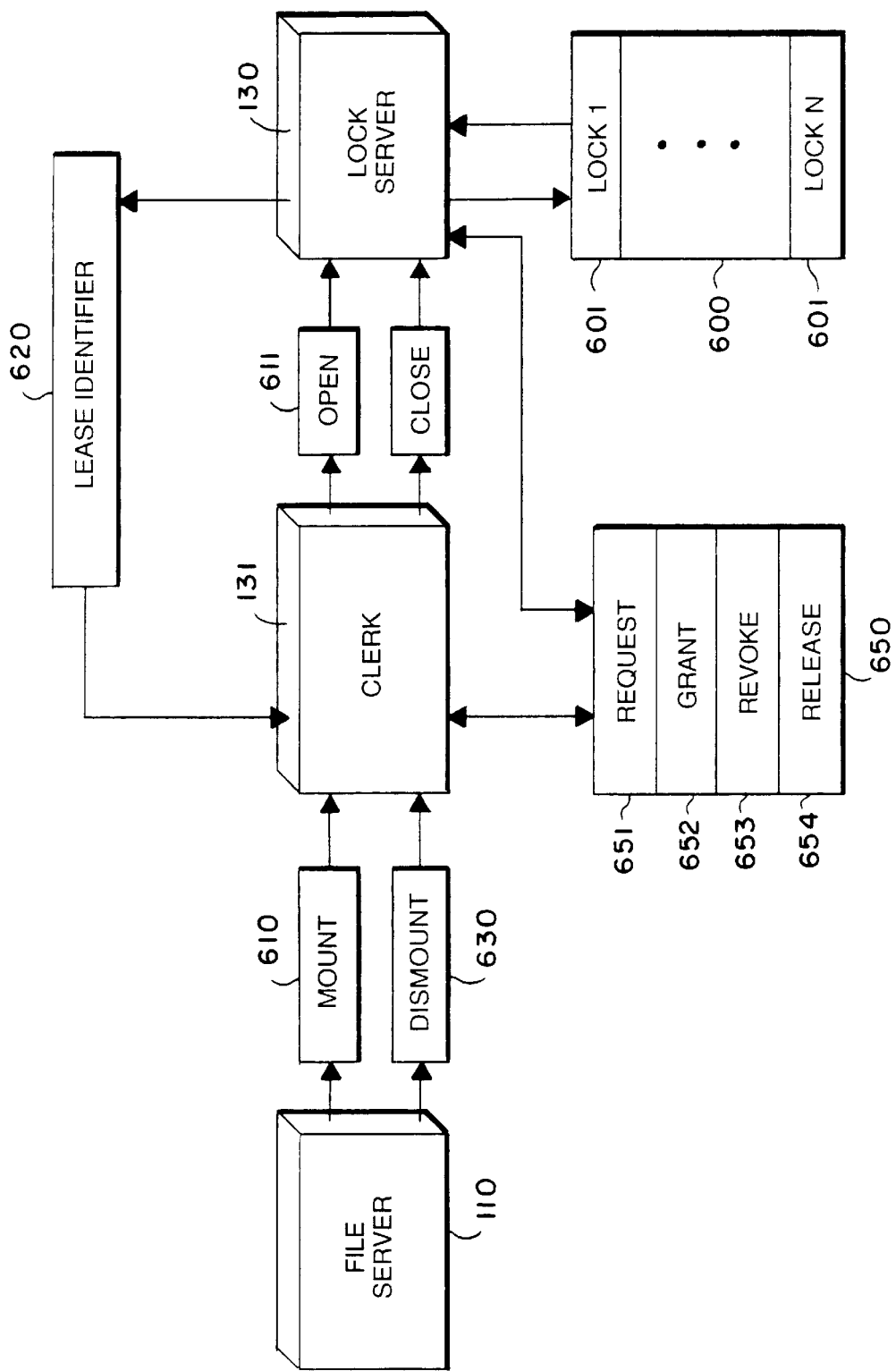
FIG. 6 is a flow diagram of locking transactions.

As shown in FIG. 6, each copy of the lock server 130 uses a clerk module 131 that is linked into the file server. The lock servers maintain a lock table 600. The lock table 600 is identified by a character string. Individual locks 601 within each table 600 are identified by a 64-bit integer values. Recall, a single file system uses only one virtual disk, although multiple file servers can be mounted on the same computer system.

When a file server is mounted 610, the server 110 calls into the clerk 131. The clerk 131 requests the lock server 130 to open 611 the associated lock table 600. The lock server gives the clerk a lease identifier 620 on a successful open 611, which is used in all subsequent communication between the clerk and the lock server. When the file server is dismounted 630, the clerk closes 631 the associated lock table 600.

The clerks and the lock servers communicate via asynchronous messages rather than remote procedure calls (RPC) to minimize the amount of memory used, and to achieve good flexibility and performance.

As shown in FIG. 6, the basic message types 650 that operate on the locks 601 are request 651, grant 652, revoke 653, and release 654. The request and release message types are sent from the clerk to the lock server, whereas the grant and revoke message types are sent from the lock server to the clerk. Lock upgrade and downgrade operations are also handled using these four message types.

The lock server uses a fault-tolerant, distributed failure detection method to detect the failure of copies of the lock server. This is the same method used by the disk server 120. The method is based on the timely exchange of "heartbeat" messages between copies of the lock servers. The method uses a majority consensus to tolerate network partitions.

Locks consume memory at the server and at each clerk. In a preferred implementation, the lock server allocates a block of 112 bytes per lock, in addition to 104 bytes per clerk that has an outstanding or granted lock request. Each client uses up 232 bytes per lock. To avoid consuming too much memory because of sticky locks, clerks discard locks that have not been used for a long time, for example, after one hour.

A small amount of global state information that does not change often is consistently replicated across all copies of the lock server using an algorithm described by Lamport in "The part-time parliament," Research Report 49, System Research Center, Digital Equipment corporation, September 1989.

The algorithm uses global state information including a list of lock servers, a list of locks that each lock server is responsible for serving, and a list of clerks that have opened but not yet closed each lock table. This information is used to achieve consensus, to reassign locks across lock servers, to recover lock state from clerks after a lock server failure, and to facilitate recovery of failed servers. For efficiency, locks are partitioned into about one hundred distinct lock groups. The locks are assigned to servers by group, not individually.

Lock Reassignment

Locks are occasionally reassigned across lock servers to compensate for a failed lock server, or to take advantage of a newly recovered lock server. A similar reassignment occurs when a lock server is permanently added to or removed from the system. In such cases, the locks are always reassigned such that the number of locks served by each server is balanced, the number of reassignments is minimized, and each lock is served by exactly one copy of the lock server.

The reassignment occurs in two phases. In the first phase, lock servers that lose locks discard them from their internal state. In the second phase, lock servers that gain locks contact the clerks that have the relevant lock tables open. The servers recover the state of their new locks from the clerks, and the clerks are informed of the new servers for their locks.

When a copy of the file server fails, the locks that are held by the failed server cannot be released until appropriate recovery actions have been performed. Specifically, the log of the failed copy must be processed and any pending updates must be written to disk.

When a lease of a copy of the file server expires on one machine, the lock server requests the clerk of another machine to perform recovery and to then release all locks belonging to the server with the expired lease. This clerk is granted a lock to ensure exclusive access to the log. This lock is itself covered by a lease so that the lock server will start another recovery process should this one fail.

In general, the file system as disclosed herein tolerates network partitions, continuing to operate when possible and otherwise shutting down cleanly. Specifically, the disk server 120 can continue operation in the face of network partitions, as long as a majority of the copies of the disk server remain functional and in communication. However, portions of the virtual disk may be inaccessible when there is no replica in the majority partition. Lock services can be provided as long as a majority of lock servers are up and in communication. If a file server is partitioned away from the lock server, then it will be unable to renew its lease. The lock server will declare such a file server failed, and initiate recovery from its log on the virtual disk.

If a file server is partitioned away from the disk server, then the separated file server will be unable to read or write the virtual disk. In either of these cases, the server will disallow further file access by user programs until the partition heals, and the file system is remounted.

There is a small hazard when a file server's lease expires. If the server did not really fail, but was merely out of contact with the lock server due to network problems, then the file server may still try to access the disk server after its lease has expired. Therefore, each copy of the file server checks that its lease is still valid and will still be valid for at least a predetermined number of "t" seconds before attempting any writes to the disk server.

The disk server, however, does no checking when it receives a write request. Thus, if there is a sufficient time delay between the file server's lease check and the arrival of the subsequent write request at the disk server, then there could be a problem. The lease could have expired and associated locks could have been granted to a different server. If a large enough error margin is used, for example, "t" is fifteen seconds, then under normal circumstances this problem would rarely occur.

The problem can be completely eliminated by adding an expiration time stamp to each write request for the disk server. The time stamp is set to the current lease expiration time at the moment the write request is generated, minus the margin of "t" seconds. Then, the disk driver can ignore any write request with a timestamp less than the current time. This method reliably rejects writes with expired leases, provided that the clocks used by the file and disk server are synchronized to within the time margin "t."

An alternative method does not require synchronized clocks. Here, the lock server is integrated with the disk server, and the lease identifier obtained from the lock server is included with every write request to the disk server so that the disk server can reject any write request with an expired lease identifier.

Adding and Removing Servers

As the file system grows and changes, the system administrator will occasionally need to add or remove computer systems. The present design makes this task easy. Adding another file server to a running system requires a minimal amount of administrative work. The new server need only be told which virtual disk to use, and where to find a copy of the lock server. When the new file server is mounted, the new file server contacts the lock server to obtain a lease as shown in FIG. 6, determines which portion of the log space to use from the lease identifier, and goes into operation. The administrator does not need to touch the other copies of the file server; they automatically adapt to the presence of the new file server.

Removing a file server is even easier. It is adequate to simply shut the server off. It is preferable for the server to flush all its dirty data and release its locks before halting, but this is not strictly needed. If the server halts abruptly, recovery will run on its log the next time one of its locks is needed, bringing the shared disk into a consistent state. Again, the administrator does not need to touch the other servers. Disks can also be added and removed transparently. Lock servers are added and removed in a similar manner.

Backup

The disk driver 120 includes the capability to make full dumps of the file system as "snaphots." The disk server allows a client to create an exact copy of a virtual disk at any point in time. The snapshot copy appears identical to an ordinary virtual disk, except that it cannot be modified, i.e., the snapshot is identified as read-only. The implementation uses copy-on-write techniques for efficiency. The snapshots are crash-consistent; that is, a snapshot reflects a coherent state of the virtual disk.

Hence, it is possible to backup the file system simply by taking a snapshot with the disk server, and subsequently copying the snapshot to tape. The snapshot will include all the logs, so the snapshot can be restored by copying it back to a new virtual disk, and running recovery on each log. Due to the crash-consistency, restoring from a snapshot reduces to the same problem as recovering from a system-wide power failure.

This scheme can be improved with a minor change to the file server, creating snapshots that are consistent at the file system level and require no recovery. This can be accomplished by having the backup program force all the file servers into a "barrier" implemented using an ordinary global lock supplied by the lock server. The file server acquires this lock in shared mode to do any modification operation, while the backup process requests it in exclusive mode.

When the file server receives a request to release the barrier lock, the server enters the barrier by blocking all new file system calls that modify data, cleaning all dirty data in its cache and then releasing the lock. When all copies of the file server have entered the barrier, the backup program is able to acquire the exclusive lock. The disk server then makes a snapshot and releases the lock. At this point the servers reacquire the lock in shared mode, and normal operation resumes.

With this scheme, the new snapshot can be mounted as a file system volume with no need for recovery. The new volume can be accessed on-line to retrieve individual files, or the volume can be copied to tape in a conventional backup format that does not require file system for restoration. The new volume must be mounted read-only, however, because disk server snapshots are generally read-only. The disk server can be extended to support writable snapshots.

Summary

The invention builds a file system as two layers: a first layer provides names, directories, and files, and the second layer provides a storage repository. Because, the storage facility of the second layer is substantially different from prior art systems, the services of the first layer are also substantially different than prior art file systems. The second layer provides highly available storage that can scale in throughput and capacity as resources are added to it. However, the second layer has no provision for coordination or sharing the storage for multiple client programs. Also, since the second layer is disk-like, and not file-like, the first layer is required so that user programs can access the files stored on the physical disks 102.

The strength of the file system is that it allows transparent server addition, deletion, and failure recovery. It is able to do this easily by combining write-ahead logging and locks with a uniformly accessible, highly available store. Another strength of the file system is its ability to create consistent backups while the system is running as discussed above.

There are some aspects of the design that can be problematic. Using the file system with a replicated virtual disk implies that logging sometimes occurs, first to the file server log, and second to duplicate storage of the RAID device itself.

In addition, the file server 110 does not use disk location information in placing data—indeed it cannot—because the second layer 120 virtualizes the disks. Finally, the file server locks entire files and directories rather than individual blocks. However, measured performance on an type engineering workload seem to indicate that these aspects of the design are well tolerated.

It is understood that the above-described embodiments are simply illustrative of the principles of the invention. Various other modifications and changes may be made by those skilled in the art which will embody the principles of the invention and fall within the spirit and scope thereof as set out in the claims attached.

We claim:

1. A file system distributed over a plurality of computers connected by a network, the plurality of computers executing user programs, and the user programs accessing files stored on a plurality of physical disks connected to the plurality of computers, comprising:

a plurality of file servers executing on the plurality of computers as a single distributed file server layer;

a plurality of disk servers executing on the plurality of computers as a single distributed disk server layer; and a plurality of lock servers executing on the plurality of computers as a single distributed lock server to coordinate the operation of the distributed file and disk server layers so that the user programs can coherently access the files on the plurality of physical disks;

wherein the disk server layer organizes the plurality of physical disks as a single virtual disk having a single address space.

2. The file system of claim 1 wherein a first one of the plurality of computers executes at least one of the user programs and at least one of the plurality of file servers.

3. The file system of claim 2 wherein the first computer also includes a file system switch and a virtual disk driver.

4. The file system of claim 2 wherein the first computer is a diskless workstation.

5. The file system of claim 2 wherein a second one of the plurality of computers executes at least one of the plurality of disk servers and at least one of the plurality of lock servers.

6. The file system of claim 5 wherein the second computer is connected to at least one of the plurality of physical disks.

7. The file system of claim 1 wherein the virtual disk includes a log for each of the plurality of file servers.

8. The file system of claim 1 wherein any of the user programs executing on any of the plurality of computers can access any file on any of the physical disks.

9. The file system of claim 1 further including means for making a snapshot of the virtual disk while the user programs, file, disk, and lock servers execute to backup the files.

10. A file system distributed over a plurality of computers connected by a network, the plurality of computers executing user programs, and the user programs accessing files stored on a plurality of physical disks connected to the plurality of computers, comprising:

a plurality of file servers executing on the plurality of computers as a single distributed file server layer;

a plurality of disk servers executing on the plurality of computers as a single distributed disk server layer;

a plurality of lock servers executing on the plurality of computers as a single distributed lock server to coordinate the operation of the distributed file and disk server layers so that the user programs can coherently access the files on the plurality of physical disks; and a memory storing a plurality of lock tables.

11. The file system of claim 10 wherein the plurality of lock tables store read locks and write locks, the read locks permitting the plurality of file servers to read files, and the write locks permitting the plurality of file servers to read and write files.

12. The file system of claim 11 wherein each of the plurality of file servers is associated with a clerk.

13. The file system of claim 12 further including means for generating a lease identifier for each lock table, and means for communicating the lease identifier to the associated file server when the associated file server is mounted on one of the plurality of computers for execution.

14. The system of claim 13 wherein the lease identifier has an associated expiration time.

15. The file system of claim 14 further including means for deleting a particular lock table when the associated lease expires.

16. The file system of claim 15 including means for dynamically reassigning the read locks and the write locks among the lock tables.

17. The file system of claim 1 wherein the number of computers, users programs, physical disks, files, file servers, disk servers, and lock servers can dynamically change while the user programs, file servers, disk servers, and lock servers execute.

18. The file system of claim 17 wherein the arrangement of the computers, user programs, physical disks, files, file servers, disk servers, and lock servers over the plurality of computers and physical disks can dynamically change while the user programs, file servers, disk servers, and lock servers execute.

19. A method for accessing files from user programs executing on a plurality of computers connected by a network. the files stored on a plurality disks connected to the plurality of computers, comprising:

executing a plurality of file servers on the plurality of computers as single distributed file server layer;

executing a plurality of disk servers on the plurality of computers as a single distributed disk server layer;

executing a plurality of lock servers on the plurality of computers as a single distributed lock server to coordinate the operation of the distributed file and disk server layers so that the user programs can coherently access the files on the plurality of physical disks; and organizing the plurality of physical disks as a single virtual disk having a single address space.

20. The method of claim 19 wherein a first one of the plurality of computers executes at least one of the user programs and at least one of the plurality of file servers.

* * * * *

UNITED STATES PATENT AND TRADEMARK OFFICE
CERTIFICATE OF CORRECTION

PATENT NO. : 6,173,293 B1
DATED : January 9, 2001
INVENTOR(S) : Thekkath et al.

It is certified that error appears in the above-identified patent and that said Letters Patent is hereby corrected as shown below:

Column 15,
Line 30, delete "claim 1" and insert therefor -- claim 10 --

Signed and Sealed this

Fifth Day of July, 2005

JON W. DUDAS
*Director of the United States Patent and Trademark Office*